United States Patent [19]
Walker

[11] Patent Number: 5,919,278
[45] Date of Patent: Jul. 6, 1999

[54] REGISTER FILTER ASSEMBLY

[76] Inventor: Randy A. Walker, 3109 Nance Country Dr., Climax, N.C. 27233

[21] Appl. No.: 09/175,023

[22] Filed: Oct. 19, 1998

[51] Int. Cl.$^6$ .................................................. B01D 35/02
[52] U.S. Cl. ............................ 55/385.1; 55/422; 55/424; 55/426; 55/427; 55/DIG. 35
[58] Field of Search ............................. 55/422, 424, 426, 55/427, DIG. 35, 385.6, 385.1

[56] References Cited

U.S. PATENT DOCUMENTS

| | | | |
|---|---|---|---|
| 2,157,307 | 5/1939 | Savage | 55/422 |
| 3,520,115 | 7/1970 | Bowen | 55/422 |
| 3,696,589 | 10/1972 | Liebig et al. | 55/422 |
| 4,963,170 | 10/1990 | Weber et al. . | |
| 5,100,445 | 3/1992 | Johnson et al. . | |
| 5,167,677 | 12/1992 | Hammes . | |
| 5,223,011 | 6/1993 | Hanni . | |
| 5,240,487 | 8/1993 | Kung . | |
| 5,512,074 | 4/1996 | Hanni et al. . | |
| 5,597,392 | 1/1997 | Hawkins et al. . | |
| 5,676,718 | 10/1997 | Davison et al. | 55/385.6 |
| 5,776,218 | 7/1998 | Enns | 55/DIG. 35 |

*Primary Examiner*—Jay H. Woo
*Assistant Examiner*—Minh-Chau T. Pham

[57] ABSTRACT

This invention is drawn to a filter assembly for use in conventional floor registers in HVAC systems. The assembly includes a diamond shaped center rod which splits the air flowing through the filter assembly and supports a pair of hinged doors which open during active periods of the HVAC cycle and close during the dormant period of the HVAC cycle. A sponge-like, tacky adhesive filter is positioned on the top surface of each door to filter dust or dirt particles that drift into the register during the dormant period of the HVAC cycle.

10 Claims, 3 Drawing Sheets

REGISTER FILTER ASSEMBLY

BACKGROUND OF THE INVENTION

1. Field of the Invention

This invention pertains to a filter assembly for use with a conventional HVAC floor register.

2. Description of the Prior Art and Objectives of the Invention

In recent years, consumers have demanded that their immediate environment be pleasant, clean and comfortable. As a result, more attention is paid to providing clean air to breath in the home environment. Contaminant particles, such as dust and dirt found in the home are aggravating and contribute to health problems, especially among those suffering from bronchitis, asthma, and other lung related illnesses. Conventional HVAC ducts and registers attempt to filter this dust and dirt from the air, but frequently just add to its circulation with the use of forced air. Typically dust will fall through the register into the duct below during periods of inactivity and then be blown back into the inhabited space when the forced air is activated.

U.S. Pat. Nos. 5,240,487; 5,167,677; 5,223,011; 4,963,170; 5,100,445; and 5,512,074 all attempt to deal with the problem in a variety of means, but fail to provide a simple, easily installed filter which effectively removes contaminants from the environment. While the devices may include filters, the forced air travels through these filters, potentially forcing the contaminants back into the living space.

Thus with the above mentioned needs, it is an objective of the present invention to provide a filter which traps contaminants while precluding air passage therethrough to dislodge said contaminants.

It is a further objective of the present invention to provide a filter which is adapted to be used with conventional floor registers.

It is still a further objective of the present invention to provide a filter which splits the air flow through the use of a diamond shaped dividing rod.

It is yet a further objective of the present invention to provide a filter which includes a pair of doors which open when air is forced therethrough.

These and other objectives and advantages will become readily apparent to those skilled in the art upon reference to the following detailed description and accompanying drawing figures.

SUMMARY OF THE INVENTION

The aforedescribed objectives and advantages are realized by inserting a sleeve into the depending portion of a conventional floor register. Positioned within the sleeve is a diamond shaped center rod, which extends the length of the sleeve. A pair of hinged doors rest on the upper surfaces of the center rod when the HVAC system is dormant. When the HVAC system is active, air forces the doors upwardly and away from the center rod so that the air may pass through the register as is conventional.

On the upper surfaces of each of the hinged doors, a filter material complete with an adhesive is disposed. As dust, dirt or other contaminants fall downwardly from the air through the filter, they are trapped on the adhesive and filter material. However, when the HVAC system is active the doors are open, thereby removing the filter material from the path of the air, preventing the air from dislodging the contaminants from the filter and allowing the air to flow unimpeded into the living space. Additionally, the lower edges of the sleeve are inwardly cupped around the perimeter to catch any dust which escapes the filter when the doors are opened. The filter is attached to the upper surface of the doors by means of conventional fasteners such as an adhesive or a lip integrally formed with the door.

DETAILED DESCRIPTION OF THE PREFERRED EMBODIMENT AND OPERATION OF THE INVENTION

Figure 2:
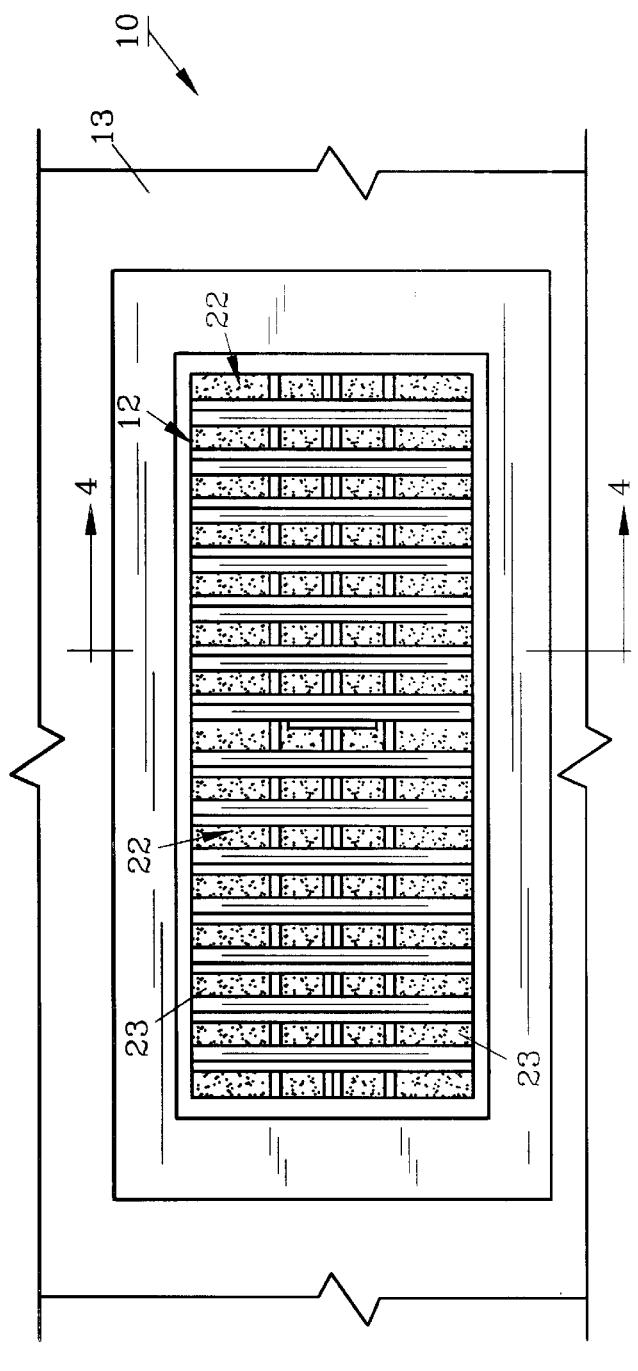
FIG. 2 illustrates a top view of the register and assembly of FIG. 1.
Figure 1:
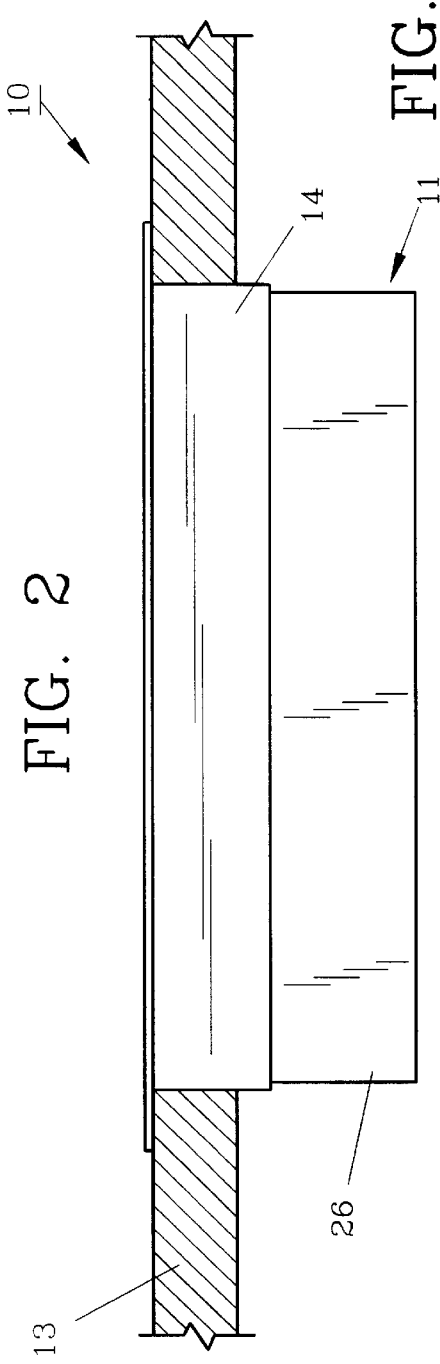
FIG. 1 shows a side elevational view of a conventional floor register with the filter assembly of the present invention.

Turning now to the drawings, specifically FIG. 1 shows conventional register 10 positioned in floor 13. Floor 13 surrounds depending portion 14, which receives filter assembly 11 therein, specifically sleeve 26. Filter assembly 11 extends the length of depending portion 14 and is sized for a snug pressure fit. Thus, the size of filter assembly 11 depends on the size of the commercially available registers, such as register 10. Air conventionally passes through grate 12 seen in FIG. 2, which may be opened and closed as is well understood. Filter assembly 11 may be metal or a polymeric material as desired, but is preferably rigid and rectilinear.

Figure 3:
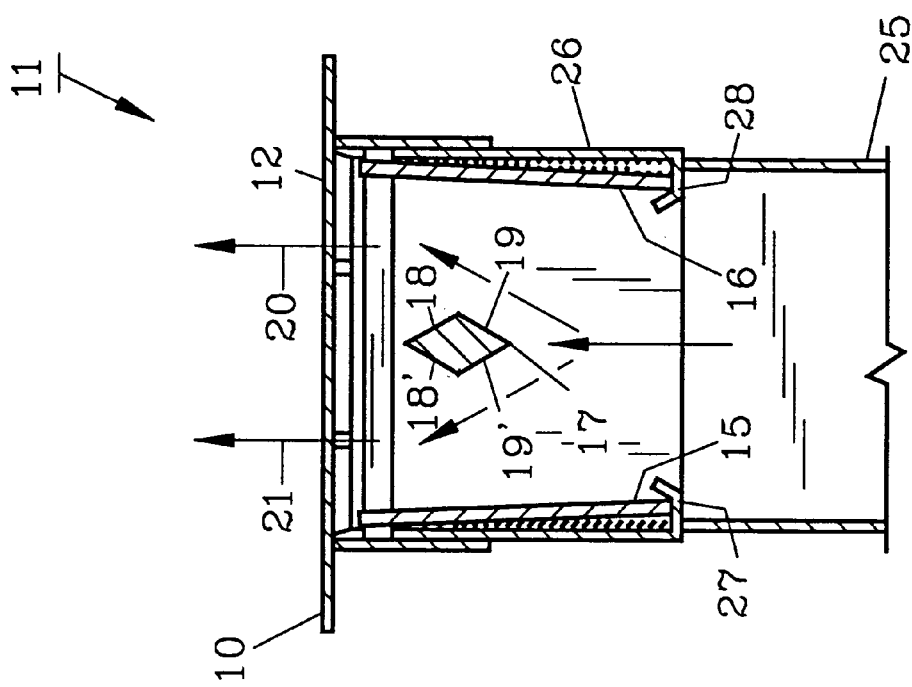
FIG. 3 demonstrates a cross-sectional view of the register and sleeve taken along lines 4—4 of FIG. 2, but with the filter doors open.
Figure 4:
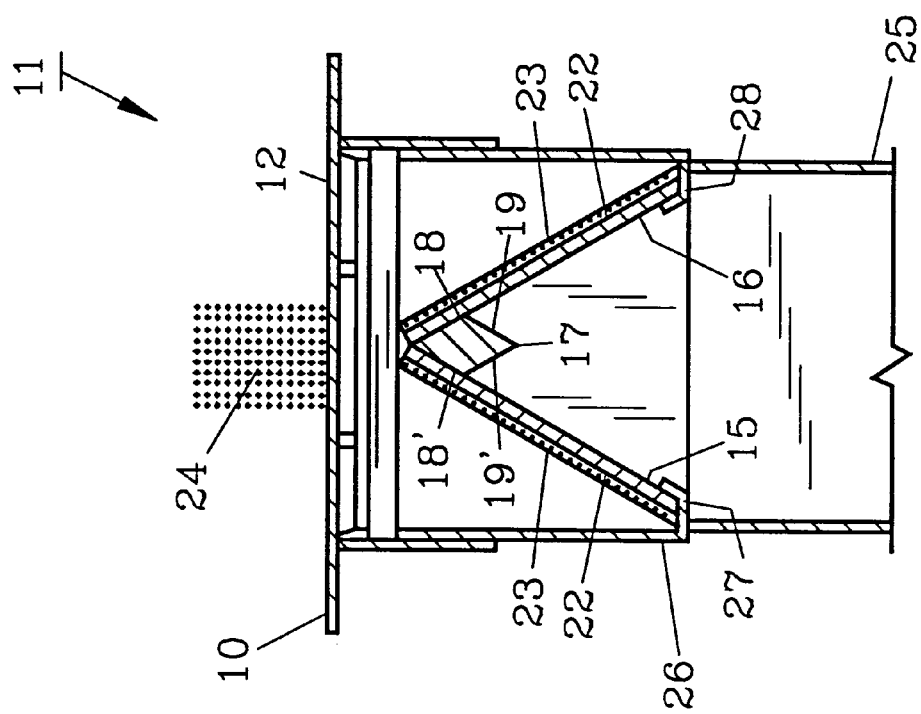
FIG. 4 features the filter assembly of FIG. 3, but with the doors closed.

FIGS. 3 and 4 show the interior of filter assembly 11 attached to duct work 25 and register 10. FIG. 3 shows filter assembly 11 operating when the HVAC system (not shown) is active. Specifically air passing through duct work 25 is split by lower surfaces 19, 19' of diamond shaped center rod 17 into first air flow 20 and second air flow 21 on either side of rod 17. Air flows 20 and 21 force hinged doors 15 and 16 open, thereby allowing air flows 20 and 21 to pass completely through register 10. When the HVAC system is active, dust or dirt, such as dust 24 (FIG. 4) is blown away from register 10 and hopefully into an air intake vent (not shown) for conventional filtering and conditioning. Diamond shaped center rod 17 extends the length of filter assembly 11. Additionally, as filters 22 age and adhesive 23 loses its adhesive properties or is covered with dust, cups 27 and 28 extend around the perimeter of sleeve 26 to catch any dust 24 that falls from filters 22 when doors 15 and 16 are open. This provides an additional mechanism to keep dust 24 from entering the HVAC system until new filters can be installed. Also, lips or flanges (not shown) are positioned at the ends of the sleeve beneath the doors to catch any dust that may fall between the doors and the sleeve.

In contrast to the active period of the HVAC cycle, when the HVAC system is dormant, air flows 20 and 21 terminate, thereby allowing doors 15 and 16 to close back over diamond shaped center rod 17, as seen in FIG. 4. Upper surfaces 18, 18' are slanted to complete diamond shaped center rod 17 and hold doors 15 and 16 in a tilted position for easy opening upon return to an active period in the HVAC cycle. Doors 15 and 16 each include polymeric, spongey filter 22 on their respective top surfaces. Each filter 22 includes non-setting adhesive layer 23 on its outer surface. When dust 24 falls through grate 12 of register 10, it is precluded from entering duct work 25 by doors 15 and 16. Further dust 24 is trapped by filters 22 and adhesive 23 and remains there until filter assembly 11 is removed. Thus, filter assembly 11 effectively stops the cycle of contaminants entering the duct work during dormant periods of an HVAC cycle and being blown back into the living space (not shown) during active periods of the HVAC cycle. This provides cleaner air and generally more pleasing living environment.

The method of using the present invention comprises installing filter assembly 11 substantially as described into conventional floor register 10. When the HVAC system is active, doors 15 and 16 remain open, but upon entering the dormant period of the HVAC cycle, doors 15 and 16 close and filters 22 begin filtering dust 24 and other contaminants (not shown) that drift through register 10.

The preceding recitation is provided as an example of the preferred embodiment and is not meant to limit the nature of scope of the present invention or appended claims.

I claim:

1. A filter assembly comprising:

a sleeve having a longitudinal axis;

a diamond shaped center rod, said center rod positioned in said sleeve, said center rod parallel to the longitudinal axis of said sleeve; and a first hinged door, said first hinged door having an open and a closed position, said first hinged door resting on said center rod when in said closed position, said door having a longitudinal axis, said door longitudinal axis parallel to said sleeve longitudinal axis.

2. The filter assembly of claim 1 further comprising a second hinged door, said second hinged door having an open and a closed position, said second hinged door resting on said center rod when in said closed position.

3. The filter assembly of claim 1 further comprising a filter, said filter positioned on said hinged door.

4. The filter assembly of claim 3 further comprising an adhesive, said adhesive positioned on said filter.

5. The filter assembly of claim 1 wherein said diamond shaped center rod comprises two lower surfaces, said lower surfaces splitting air flowing thereagainst.

6. The filter assembly of claim 1 wherein said filter assembly is rectilinear.

7. The filter assembly of claim 1 wherein said sleeve is polymeric.

8. A filter assembly and register in combination, said register comprising a grate and a depending portion, said depending portion extending downwardly from said grate;

said filter assembly comprising:

a sleeve, said sleeve positioned within said depending portion, said sleeve having a longitudinal axis;

a diamond shaped center rod, said center rod positioned in said sleeve, said center rod parallel to the longitudinal axis of said sleeve; and a first hinged door, said first hinged door having an open and a closed position, said first hinged door resting on said center rod when in said closed position, said first door having a longitudinal axis, said first door longitudinal axis parallel to said sleeve longitudinal axis;

a second hinged door, said second hinged door having an open and a closed position, said second hinged door resting on said center rod when in said closed position, said second door having a longitudinal axis, said second door longitudinal axis parallel to said sleeve longitudinal axis;

a pair of filters, each of said pair of filters positioned on different hinged doors; and an adhesive, said adhesive applied to both of said pair of filters.

9. The combination of claim 8 wherein said filter assembly is rectilinear.

10. The combination of claim 8 wherein said sleeve is polymeric.

\* \* \* \* \*